United States Patent
Meyr

(10) Patent No.: US 10,209,861 B2
(45) Date of Patent: *Feb. 19, 2019

(54) STICKY MESSAGES

(71) Applicant: T-Mobile USA, Inc., Bellevue, WA (US)

(72) Inventor: Nathaniel Meyr, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/451,316

(22) Filed: Mar. 6, 2017

(65) Prior Publication Data
US 2017/0242566 A1 Aug. 24, 2017

Related U.S. Application Data

(63) Continuation of application No. 13/107,817, filed on May 13, 2011, now Pat. No. 9,588,669.

(60) Provisional application No. 61/444,054, filed on Feb. 17, 2011.

(51) Int. Cl.
| | |
|---|---|
| G06F 3/0481 | (2013.01) |
| G06F 3/0488 | (2013.01) |
| G06Q 10/10 | (2012.01) |
| G06F 17/24 | (2006.01) |
| H04N 21/4786 | (2011.01) |
| H04N 21/488 | (2011.01) |
| H04M 1/725 | (2006.01) |

(52) U.S. Cl.
CPC ........ *G06F 3/04817* (2013.01); *G06F 3/0481* (2013.01); *G06F 3/0488* (2013.01); *G06F 17/241* (2013.01); *G06Q 10/107* (2013.01); *H04M 1/72547* (2013.01); *H04N 21/4786* (2013.01); *H04N 21/4882* (2013.01)

(58) Field of Classification Search
CPC .... G06F 3/0481; G06F 3/0488; G06F 17/241; G06Q 10/107; H04N 21/4786; H04N 21/4882; H04M 1/72552
See application file for complete search history.

(56) References Cited

U.S. PATENT DOCUMENTS

| | | | |
|---|---|---|---|
| 6,356,633 | B1 | 3/2002 | Armstrong |
| 6,430,174 | B1 | 8/2002 | Jennings et al. |
| 7,212,814 | B2 | 5/2007 | Wilson et al. |
| 7,330,100 | B2 | 2/2008 | Yu |

(Continued)

OTHER PUBLICATIONS

Ledford, "Web Geek's Guide to the Android™-Enabled Phone", (Sep. 18, 2009), Que, p. vi, 36-39, 64, 72, 78, 89, and 97-99.*

(Continued)

*Primary Examiner* — Ajay M Bhatia
*Assistant Examiner* — Mong-Shune Chung
(74) *Attorney, Agent, or Firm* — Perkins Coie LLP

(57) ABSTRACT

Described herein are techniques related to sticky messaging, which enable the use of the content of text and/or multimedia messages outside the context of the messaging inbox of a telecommunications device, such as a mobile phone. An implementation described herein includes posting of the content (e.g., text, image, audio, and video) of a message onto a home screen of the telecommunications device. This Abstract is submitted with the understanding that it will not be used to interpret or limit the scope or meaning of the claims.

18 Claims, 7 Drawing Sheets

(56) References Cited

U.S. PATENT DOCUMENTS

| | | |
|---|---|---|
| 9,588,669 B2 | 3/2017 | Meyr |
| 2004/0252677 A1 | 12/2004 | Kushita |
| 2005/0091578 A1* | 4/2005 | Madan .................. G06F 17/241 |
| | | 715/201 |
| 2005/0193345 A1 | 9/2005 | Klassen et al. |
| 2006/0218501 A1 | 9/2006 | Wilson et al. |
| 2006/0234696 A1* | 10/2006 | Cho .................. H04M 1/72547 |
| | | 455/424 |
| 2007/0081636 A1 | 4/2007 | Shaffer et al. |
| 2008/0091782 A1 | 4/2008 | Jakobson |
| 2008/0248839 A1 | 10/2008 | Zinn et al. |
| 2009/0013275 A1 | 1/2009 | May et al. |
| 2009/0172118 A1* | 7/2009 | Lee ........................ H04L 51/14 |
| | | 709/206 |
| 2010/0004921 A1 | 1/2010 | Hufnagel et al. |
| 2010/0115559 A1 | 5/2010 | Ellis |
| 2010/0240417 A1 | 9/2010 | Wickman et al. |
| 2010/0312769 A1 | 12/2010 | Bailey et al. |
| 2011/0072382 A1 | 3/2011 | Caldwell et al. |
| 2012/0023425 A1 | 1/2012 | Hackborn |
| 2012/0110470 A1* | 5/2012 | Mistry .................. G06F 3/0486 |
| | | 715/748 |
| 2012/0150970 A1* | 6/2012 | Peterson ............. G06F 3/04817 |
| | | 709/206 |

OTHER PUBLICATIONS

Eddy, J. "Google on the Go: Using an Android-Powered Mobile Phone." Feb, 12, 2009, Que, pp. 26, 57, 77, and 78.

Karch. "Long Clicks or Long Touch," Sep. 18, 2010, 1 page, Retrieved from internet on Sep. 4, 2013, <http:web.archive.org/web/20100918004011/http://google.about.com/od/l/g/long_touch_click_android.html/>.

Ledford, J. "Web Geek's Guide to the Android-Enabled Phone," Sep. 18, 2009 Que, pp. vi, 36-39, 64, 72, 78, 89, 97-99.

\* cited by examiner

STICKY MESSAGES

CROSS-REFERENCE TO RELATED APPLICATION(S)

This application claims priority benefit of U.S. Provisional Application 61/444,054, which was filed on Feb. 17, 2011. The entire contents of the Provisional Application are hereby incorporated herein by reference.

BACKGROUND

Text messaging (i.e., "texting") is one of the fastest and most reliable means of communications. Consequently, it has become popular and, indeed, ubiquitous. Generally, it involves sending a short text-only message over a mobile-communications infrastructure from mobile phone to mobile phone. Text messaging is also called Short Message Service (SMS) messaging.

For messages that contain more than just text, other messaging options exist. For example, Multimedia Messaging Services (MMS) is an extension to SMS that defines a way to send and receive multimedia messages via a mobile-communications infrastructure from mobile phone to mobile phone. Typically, multimedia messages include images, audio, and video in addition to text.

A mobile telecommunications device (such as a cell phone or smartphone) queues text or multimedia messages in a messaging inbox as the device receives such messages. From within that inbox, a user manages (e.g., reads) his messages. Indeed, with conventional approaches, the user is limited to using the content of his text and multimedia messages within the confines of the inbox.

SUMMARY

Described herein are techniques related to sticky messaging, which enable the use of the content of text and/or multimedia messages outside the context of the messaging inbox of a telecommunications device, such as a mobile phone. For example, an implementation described herein includes posting of the content (e.g., text, image, audio, and video) of a message onto a home screen of the telecommunications device.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

Figure 1:
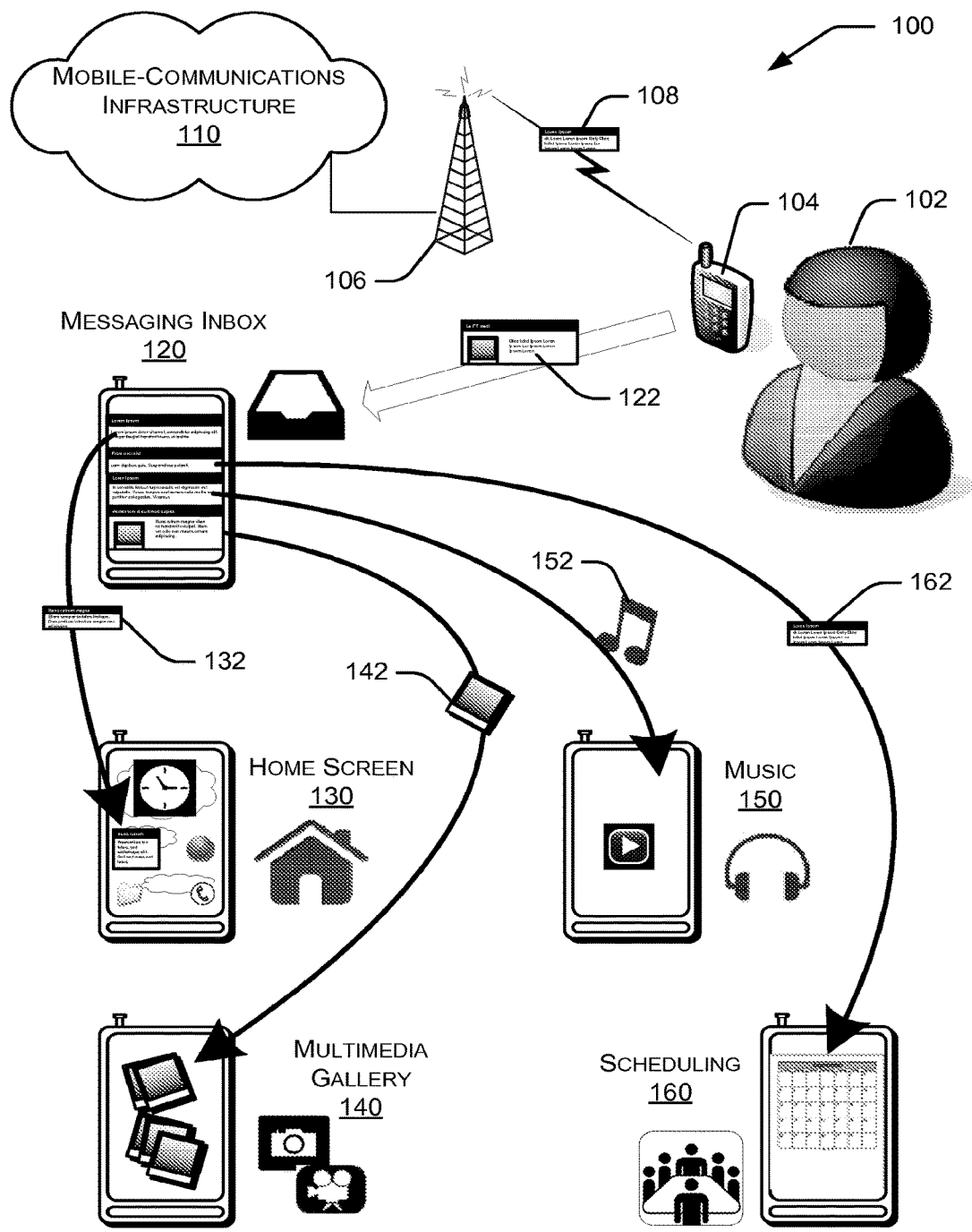
FIGS. 1-3 show exemplary scenarios illustrating the techniques described herein for sticky messaging.

The Detailed Description references the accompanying figures. In the figures, the left-most digit(s) of a reference number identifies the figure in which the reference number first appears. The same numbers are used throughout the drawings to reference like features and components. Also, note that any text smaller than ten point is presented merely to indict where text would appear in the depicted figures. Since such text is merely an indicator of where text might appear, the content of such text is unimportant to the understanding the implementations depicted.

DETAILED DESCRIPTION

Described herein are techniques related to sticky messaging, which enable the use of the content of text and/or multimedia messages outside the context of the messaging inbox of a telecommunications device, such as a mobile phone. An implementation described herein includes posting of the content (e.g., text, image, audio, and video) of a message onto a home screen of the telecommunications device. From there, the user can quickly and easily see the content of the message and, therefore, he is easily reminded of its content when he looks at his home screen.

Suppose, for example, that a friend sends a text message with important instructions where to meet him to pick him up after work. Of course, being very busy, the recipient does not have the time to commit the text to memory. So, after reviewing the text message, he makes it "sticky." So, when the recipient looks at his phone, he sees the content of the "sticky" message on his home screen. This provides a quick and easily accessible reminder of the appointment and its location.

In addition, an implementation is described herein that allows the user to set the wallpaper (i.e., background image) of his home screen to be the text and/or multimedia content of a message. Another described implementation includes storing the multimedia content of multimedia messages in an appropriate multimedia gallery of the telecommunications device. Still another implementation sends a message with an indicator so that it becomes "sticky" upon arrival.

Unless the context indicates otherwise, the terms "message," "messaging" (and the like), as used herein, refer to messages that are designed for and, indeed, are exchanged via a mobile-communication infrastructure. A text message (e.g., a SMS (Short Message Service) message) is an example of a mobile-communication infrastructure message. Another example is a multimedia message (e.g., MMS (Multimedia Message Service). Mobile-communication infrastructure messages include other messages similar in nature to SMS or MMS messages, but which may be formatted differently and/or use a different protocol than SMS or MMS messages.

When used in the context of messages, the terms "stick" or "sticky" (and the like), as used herein, refer to enabling the use of the content of mobile-communication infrastructure messages outside the context of the messaging inbox of a telecommunications device.

Exemplary Sticky Messaging Scenarios

FIG. 1 shows an exemplary sticky messaging scenario 100 in which one or more implementations may be employed. The scenario 100 includes a user 102 with a smartphone 104 that is wirelessly connected to a mobile-communications infrastructure 110 via a cellular antenna 106. The smartphone 104 may wirelessly transmit mobile-communications infrastructure messages, such as message 108, via the mobile-communications infrastructure 110.

A so-called cellular network is an example of the mobile-communications infrastructure. The mobile-communications infrastructure includes (but is not limited to) a network of typically fixed-location transceivers (e.g., cell sites, cell towers, base stations) located over a large geographic area that enable wireless communications (e.g., voice calls, data communications, messages) for a large number of portable transceivers (e.g., mobile phones, cell phones, pagers, smartphones) to communicate with one another throughout the network. The mobile-communications infrastructure also includes the messaging gateways and pathways used to relay messages from mobile phone to mobile phone.

The smartphone 104 is an example of an exemplary messaging device that may implement at least some aspects of the sticky messaging techniques described herein. The smartphone 104 has many contexts in which data is handled and presented to the user 102.

In FIG. 1, the smartphone 104 has five exemplary contexts depicted: a messaging inbox 120, a home screen 130, a multimedia gallery 140, a music collection 150, and a scheduling or calendar screen 160. Of course, other implementations of a suitable messaging device may have more and/or different contexts than are depicted here.

The smartphone 104 stashes incoming mobile-communications messages (e.g., text and/or multimedia messages) into the context of the messaging inbox 120 for presentation to and interaction with the user 102. Upon receipt, the smartphone 104 sends incoming messages, such as message 122, to the messaging inbox 120.

While viewing the contents of the messaging box 120, the user 102 may choose to move one or more messages outside the context of the inbox 120 so that it exists in another context. More precisely, the content of the one or more messages are copied to another context. Herein, this copying of message content is called "sticking" the message. Typically, the original message (and its content) that is a source of a sticky message remains intact in the messaging inbox 120. In alternative implementations, the original message may be altered or removed upon being made sticky.

Several examples of sticking messages are shown in FIG. 1. Those examples include a stick of a text message at 132, a stick of an image from a multimedia message at 142, a stick of a music file from a multimedia message at 152, and a stick of a meeting request from a text message at 162.

For the text-message stick 132, the content of the text message is placed (e.g., posted) onto the home screen 130 of the smart phone. In addition to the text of a text message, the multimedia content of a multimedia message may be stuck onto the home screen context. For example, a digital image, video, or audio may also be stuck to the home screen.

The sticky message may display its content on the home screen 130 as an icon, widget, and/or a box containing the content. In the case of a video, audio, or multiple images, the content of the sticky message may be played from the home screen 130. In addition, other information related to the source message may be displayed with the content. For example, such other information may include (but is not limited to) the sent/received date/time of the message, the sender, and the like.

Typically, a home screen is the primary and default screen (or main menu) shown when the telecommunications device powers on. Since it offers interaction with the user, it may also be called the home-screen user interface (UI). A home screen typically has information about device's current status (time, weather, communications, notifications, etc.) and houses icons and widgets. A home screen is typically wallpapered by a background image. Such image is often just called wallpaper.

In addition to posting a message onto the home screen 130, the content of the message may wallpaper the home screen. That is, the background image of the home screen 130 may be set to the image of a multimedia message. The text of such a message may be overlaid onto the background as well.

For the multimedia-message sticks 142 and 152, the multimedia content may be included into an appropriate multimedia collection of such content. Such content may be (by way of illustration and not limitation): audio, music, video, images, slideshows, applications ("apps"), playlists, ringtones, etc. For example, the multimedia-message stick 142 shows an image from a multimedia message being included into the multimedia gallery 140 (e.g., a photo gallery) of the smartphone 104. Also, for example, the multimedia-message stick 152 shows a digital music file from a multimedia message being included into the music collection 150 of the smartphone 104.

The multimedia collections may be stored in the memory of the smartphone 104 itself. Alternatively, these collections may be stored remotely and be accessed via a data connection. For example, a photo collection may be stored, at least in part, in the so-called cloud and be accessible via a connection therewith.

For the text-message stick 162, the text content of a text message is placed into a scheduling/calendaring service 160 of the smartphone 104. That is, the content of the message may be used to schedule a new event in the user's calendar. A sender may text the user 102 a meeting request. In one implementation, the user may view the request in the messaging inbox and choose an option to create a meeting event and stick the contents of the message into that event. In another implementation, the smartphone 104 may perform some degree of textual analysis of the message content to determine that it includes a meeting request. From that determination, the smartphone 104 may automatically create the meeting event in the calendar or present the user with an option to approve such an event.

Figure 2:
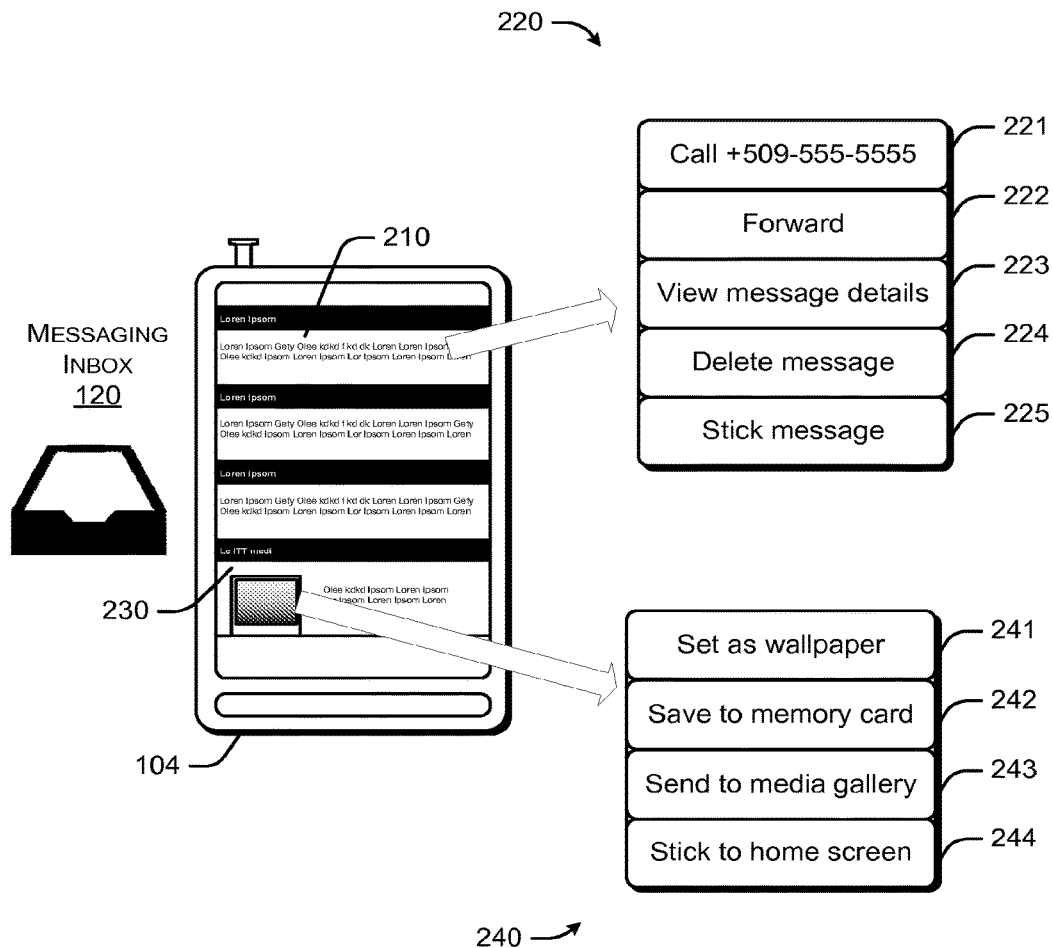

FIG. 2 shows an exemplary interaction with the user via the messaging inbox 120. With text message 210, the smartphone 104 may offer the user an option box 220. That option box 220 may include, for example, option 221 to call the sender, option 222 to forward the message, option 223 to view details about the message, option 224 to delete the message, and option 225 to stick the message. If the user chooses option 225, the content of the text message 210 is posted onto the home screen. This is like the message stick 132 depicted in FIG. 1. In one implementation, the user option to stick the message is enabled in such a way to allow the user to touch and hold, for one or more seconds, a representation of the text message 210 to cause the message to be posted or stuck onto the home screen, or another designated or predetermined screen of the smartphone 104.

With multimedia message 230, the smartphone 104 may offer the user an option box 240. That option box 240 may include, for example, option 241 to wallpaper the home screen, option 242 to store the image, option 243 to send the image to a media gallery, and option 244 to stick the message. If the user chooses option 241, the content of the multimedia message 230 is set to the background of the home screen. If the user chooses option 243, the content of the multimedia message 230 is included in the multimedia gallery. This is like the message stick 142 depicted in FIG. 1. If the user chooses option 244, the content of the multimedia message 230 is posted onto the home screen. This is like the message stick 132 depicted in FIG. 1, but with multimedia content rather than text.

Figure 3:
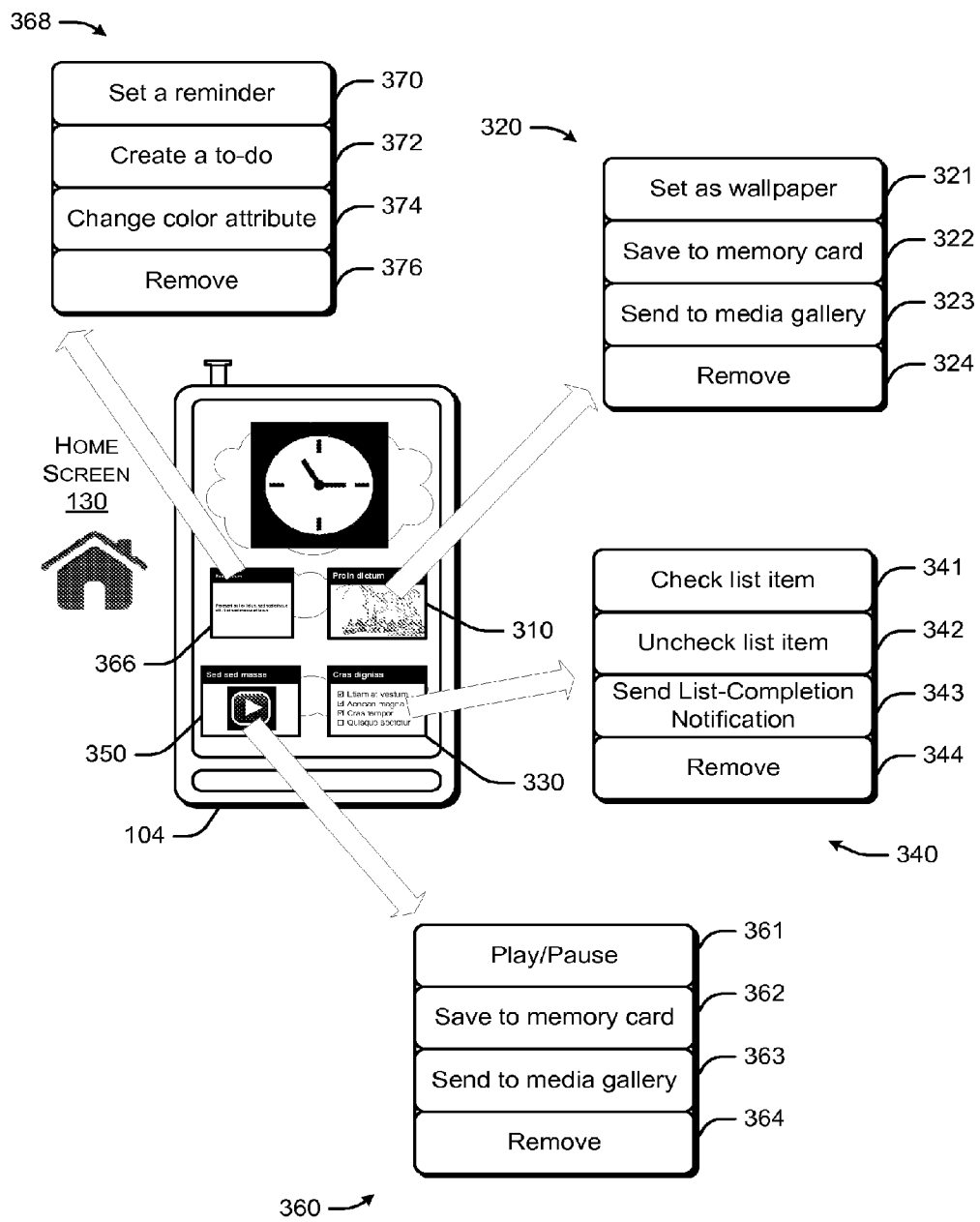

FIG. 3 shows an exemplary interaction with the user via the home screen 130. With sticky message 310, the smartphone 104 may offer the user an option box 320. That option box 320 may include, for example, option 321 to wallpaper the home screen, option 322 to store the image on a memory card, option 323 to send the image to a media gallery, and option 324 to remove the sticky message from the home screen. If the user chooses option 321, the content of the sticky message 310 is set to the background of the home screen. If the user chooses option 323, the content of the sticky message 310 is included in the multimedia gallery.

Sticky message 330 is a "list" message. This sticky message includes a to-do or checklist. In this situation, the smartphone 104 receives a message with a checklist or to-do list included therein. In some implementations, the list may be automatically detected and made sticky. In other implementations, the user may choose an option to make the list sticky.

In either situation, the list appears on the home screen 130 as a sticky message and has a user-interface that allows the user to check-off items on the list. For example, if the list is a shopping list, the user may check-off each item as she purchases it. In response to the check-off interaction, the smartphone 104 displays a checked box (or the like) next to the selected item. When the last item on the list is checked-off, the smartphone 104 generates a message to be sent to the original sender of the source message that notifies the sender that the list is completed. Either automatically or with the approval of user 102, the notification message is sent to the original sender. Once the notification is sent and/or when the list is completed, the sticky message may be automatically removed from the home screen.

With list-based sticky message 330, the smartphone 104 may offer the user an option box 340. The option box 340, as well as other described option boxes, may be offered once a user soft touches, for a predetermined time, the list-based sticky message 330. That option box 340 may include, for example, option 341 to check-off an item on the list, option 342 to un-check on a listed item, option 343 to send a notification of a completed list to the original sender of the list, and option 344 to remove the sticky message from the home screen.

Sticky message 350 contains a music or video file. With sticky message 350, the smartphone 104 may offer the user an option box 360. That option box 360 may include, for example, option 361 to play (or pause if already playing) the content of the sticky message, option 362 to store the audio or video file, option 363 to send the audio or video file to a media gallery, and option 364 to remove the sticky message from the home screen. If the user chooses option 363, the content of the sticky message 350 is included in the multimedia gallery. This is like the message sticks 142 and/or 152 as depicted in FIG. 1.

Sticky message 366 contains text from an email message, text message or the like. With sticky message 366, the smartphone 104 may offer the user an option box 368. That option box 368 may include, for example, option 370 to create a reminder or appointment in a calendar, option 372 to create a to-do in a to-do list, option 374 to change a color attribute associated with a background of the sticky message 366 or a text color, and option 376 to remove the sticky message from the home screen.

While not depicted in all implementations of sticky messages, a user may be offered the option to create a reminder and/or an appointment based upon a sticky message. With a reminder, the device will visually, audibly, and/or tactilely (e.g., vibration) remind the user about the sticky message at the designated date and/or time. With an appointment, the device places the content of the sticky message into the user's calendar. At the scheduled day and time, the user may receive a reminder about the scheduled appointment. As another option, the user may be offered the option to change one or more color attributes associated with a sticky message. For example, such a changeable color attribute may be the background, text or boarder of the sticky message.

Exemplary Sticky Messaging Device

Figure 4:
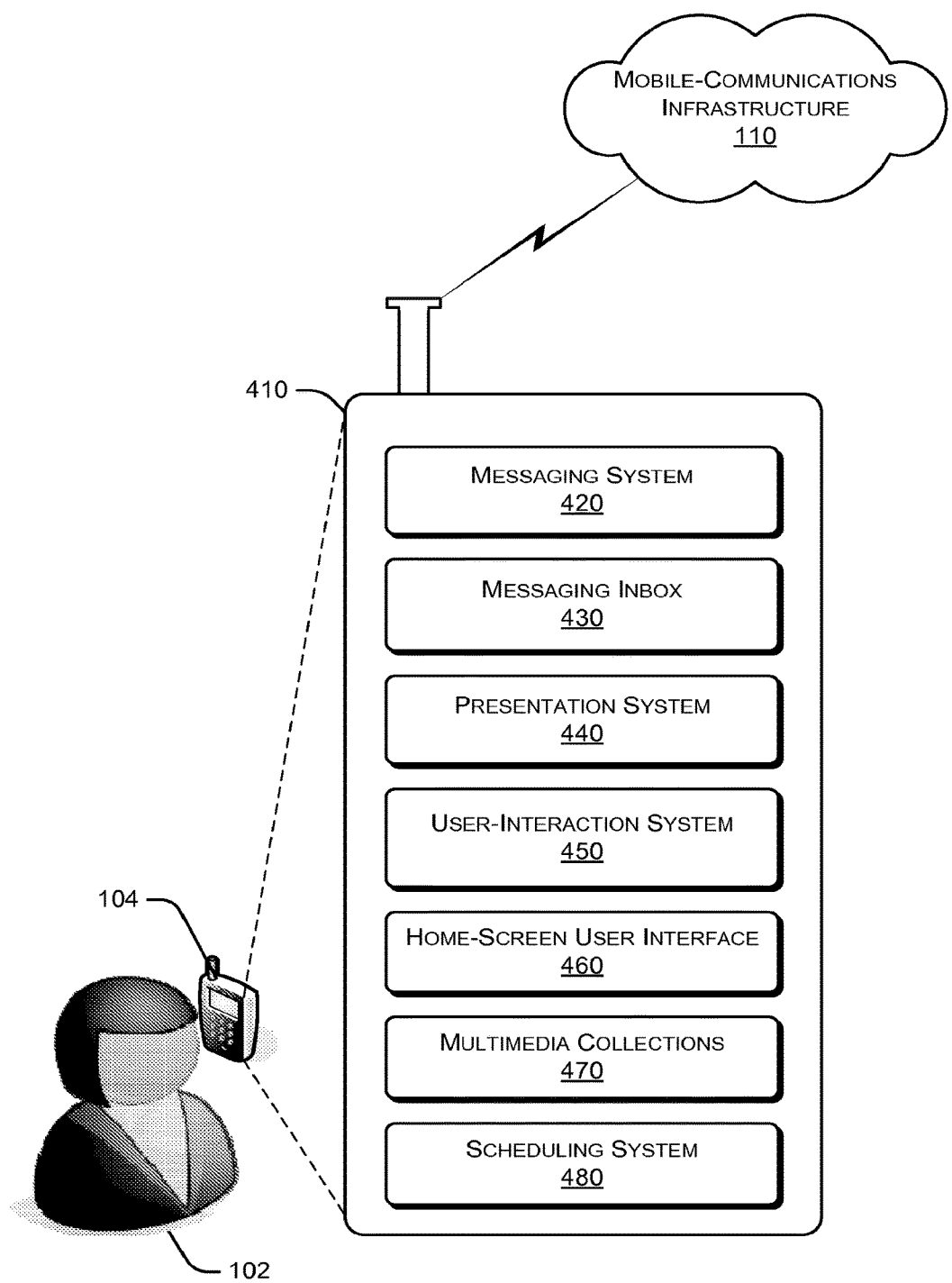
FIG. 4 illustrates an exemplary telecommunications device configured to implement the techniques described herein for sticky messaging.

FIG. 4 shows the user 102 holding the smartphone 104 (which were both introduced in FIG. 1). In FIG. 4, the smartphone 104 is shown in an expanded view as an exemplary sticky messaging device 410. The device 410 may be used to stick messages outside the context of an inbox for mobile-communications messages (such as text and/or multimedia messages). The device 410 has the capability to communicate (via cellular technology) with the mobile-communications infrastructure 110 (which has already been introduced in FIG. 1).

The sticky messaging device 410 includes a messaging system 420, a messaging inbox 430, a presentation system 440, a user-interaction system 450, a home-screen user interface (UI) 460, one or more multimedia collections 470, and a scheduling/calendaring system 480. Each of these systems may be implemented (at least in part) by a set of processor-executable instructions (e.g., software modules). Furthermore, each of these systems may include or employ one or more lower-level components of the device 410. For example, these lower-level components include processors, memory, storage, video display, user-input device (e.g., keyboard), transceiver, and the like. These and other lower-level components are described herein (e.g., as part of the description of FIG. 7).

The messaging system 420 is configured, designed, and/or programmed to send and receive mobile-communication infrastructure messages, such as SMS or MMS messages. That is, the device 410 sends and receives messages over the mobile-communications infrastructure 110 using the messaging system 420.

The messaging system 420 includes various lower-level transceiver components for handling outgoing and incoming messages over the mobile-communications infrastructure 110. The messaging system 420 may be implemented, at least in part, by a software module resident, at least in part, in the device's memory and executed by one or more processors of the device. In addition, the messaging system 420 may include, or have associated therewith, a message-handling software module (e.g., application) that will implement some or all of the functions of the sticky messaging described herein.

The messaging inbox 430 is configured, designed, and/or programmed to store incoming messages and prepare outgoing messages. In addition, the messaging inbox 430 provides a user interface (UI) for the user 102 to view and manage the messages in the inbox.

The messaging inbox 430 includes one or more lower-level memory or storage components for storing and/or accessing received messages. The memory or storage components may be volatile or non-volatile, dynamic or static, read/write-able or read only, random- or sequential-access, location- or file-addressable, and the like. The memory or storage components may be magnetic, optical, holographic, and the like. The memory or storage components may be internal to the device 410, attached externally to the device 410, or available via data communications.

The presentation system 440 is configured, designed, and/or programmed to present contexts, user interfaces (UI), and the like to the user 102. That is, a person using the device 410 may view one or more contexts offered by the device via the presentation system 440 of the device.

The presentation system 440 includes various lower-level audio/visual presentation components for showing contexts and UIs. The audio/visual components may include (by way of example and not limitation): a liquid crystal display (LCD), a flat panel, organic light-emitting diode (OLED) displays, pico-projection displays, a solid state display or other visual display device, speakers, and the like. The presentation system 440 may be implemented, at least in part, by a software module resident, at least in part, in the device's memory and executed by one or more processors of the device.

The user-interaction system 450 is configured, designed, and/or programmed to attain input from the user and, in particular, input related to the messages and sticky messages presented in cooperation with the presentation system 440. That is, a person using the device 410 provides input regarding whether to sticky a message or about how to handle an already sticky message, which would be presented on-screen by using the user-interaction system 450 of the device.

The user-interaction system 450 includes various lower-level user-input components for receiving input from the user, such as (by way of example and not limitation): keyboard, touchscreen, touchpad, trackball, and the like. The user-interaction system 450 may use some of the same audio/visual components of the presentation system 440. The user-interaction system 450 is implemented as a software module which would reside, at least in part, in the device's memory and be executed by the device's one or more processors. Alternatively, the user-interaction system 450 may be implemented as a collection of or as part of dedicated hardware or firmware. Alternatively still, the user-interaction system 450 may be implemented as a combination of hardware, firmware, or software.

The home-screen user interface (UI) 460 is configured, designed, and/or programmed to present the home screen UI to the user. The home-screen UI 460 works in cooperation with the user-interaction system 450 and the presentation system 440.

The home-screen user interface (UI) 460 is implemented as a software module which would reside, at least in part, in the device's memory and be executed by the device's one or more processors. Alternatively, home-screen user interface (UI) 460 may be implemented as a collection of or as part of dedicated hardware or firmware. Alternatively still, the home-screen user interface (UI) 460 may be implemented as a combination of hardware, firmware, or software.

The one or more multimedia collections 470 are configured, designed, and/or programmed to store collections of like multimedia files. For example, audio and music files are typically stored together in, for example, a music collection or, perhaps, a collection of audio books. Also, for example, digital photographs and videos may be stored together in a media gallery of such content. Other such collections may be those for playlists, slideshows, applications ("apps"), playlists, ringtones, etc. Typically, each collection provides a user interface (UI) for the user 102 to view, manage, and/or consume the content in the collections.

The one or more multimedia collections 470 include one or more lower-level memory or storage components for storing and/or accessing the items in their collections. The memory or storage components may be volatile or non-volatile, dynamic or static, read/write-able or read only, random- or sequential-access, location- or file-addressable, and the like. The memory or storage components may be magnetic, optical, holographic, and the like. The memory or storage components may be internal to the device 410, attached externally to the device 410, or available via data communications.

The scheduling system 480 is configured, designed, and/or programmed to manage the schedule (i.e., calendar) for the user 102. That is, a person may manage their schedule using the scheduling system 480 of the device.

The scheduling system 480 is implemented as a software module which would reside, at least in part, in the device's memory and be executed by the device's one or more processors. Alternatively, scheduling system 480 may be implemented as a collection of or as part of dedicated hardware or firmware. Alternatively still, the scheduling system 480 may be implemented as a combination of hardware, firmware, or software.

Exemplary Processes

Figure 5:
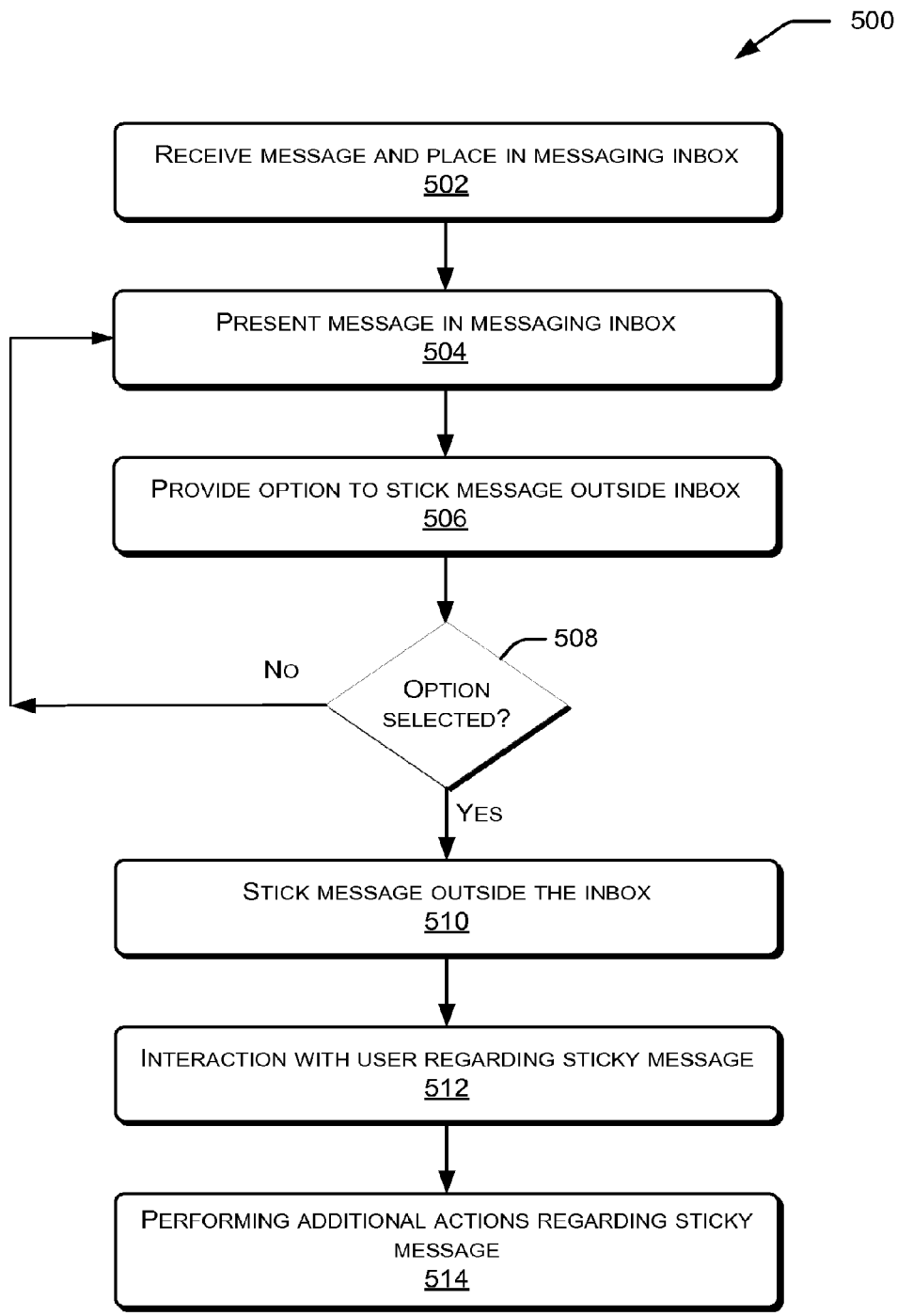
FIGS. 5 and 6 are flowcharts of processes that are configured to implement the techniques described herein for sticky messaging.
Figure 6:
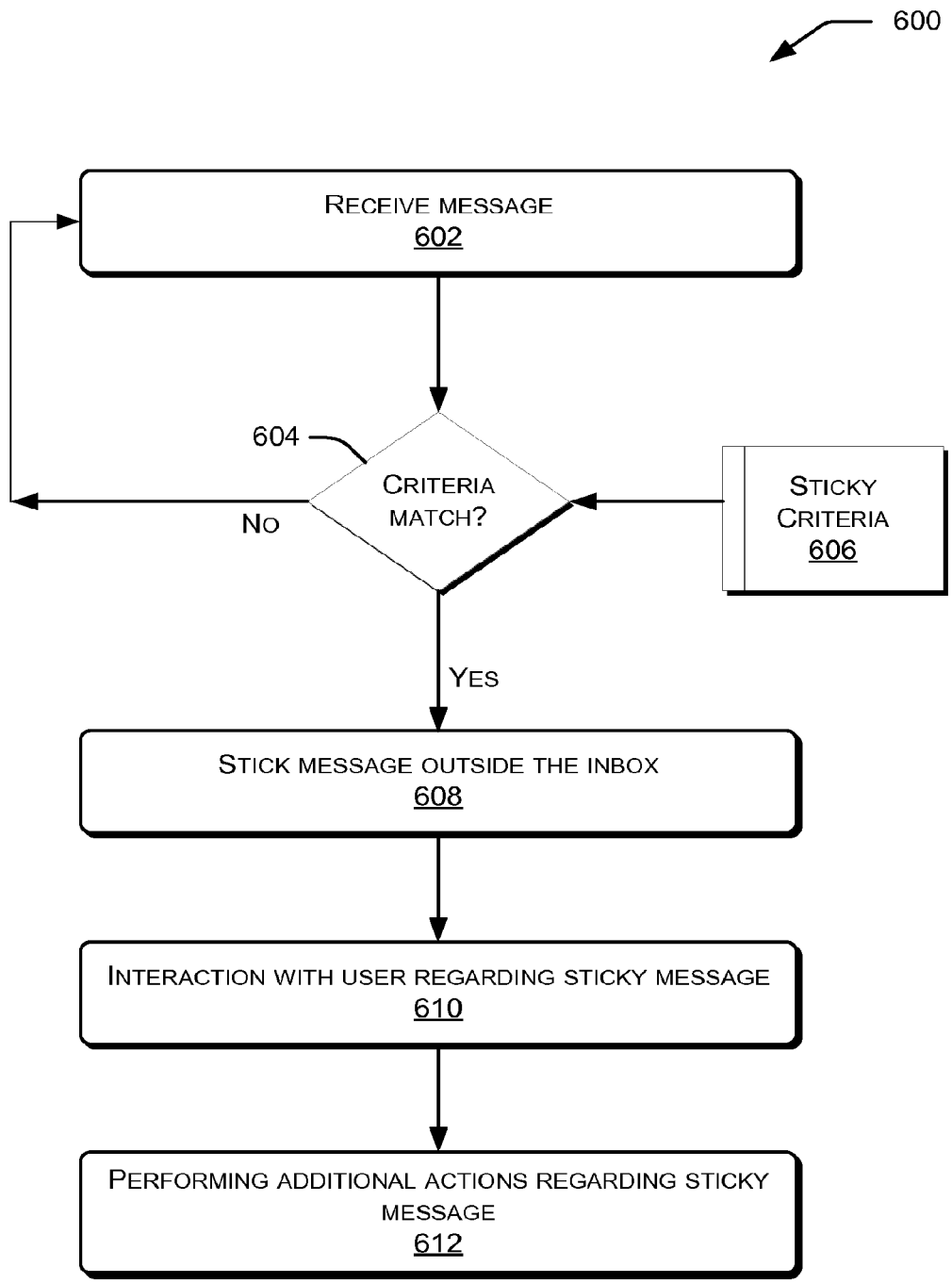

FIGS. 5 and 6 are flowcharts illustrating exemplary processes 500 and 600 that implement the techniques described herein for sticky messaging. The exemplary processes 500 and 600 are performed, at least in part, by a sticky messaging device, such as the smartphone 104 of FIG. 1, the sticky messaging device 410 of FIG. 4, and/or a telecommunications device 710 of FIG. 7. Many of the operations of the processes 500 and 600 are described with references to the illustration of such operations in previously introduced drawing figures, such as FIGS. 1-3.

The process 500 is a methodological implementation of the techniques described herein for sticky messaging where the user (such as user 102 from FIG. 1) chooses to stick messages queued in the messaging inbox (such as inbox 120 of FIG. 1).

At 502, the process 500 begins with the sticky messaging device receiving an incoming mobile-communications infrastructure message (such as a text and/or multimedia message) and placing that message into the context of a messaging inbox.

At 504, the device presents the messages in the inbox. This is shown in FIGS. 1 and 2 with regard to the messaging inbox 120.

At 506, the device provides one or more options to the user to stick content of one or more messages outside a context of the inbox. This is illustrated by option boxes 220 and 240 in FIG. 2. The content of the one or more messages may include (by way of example and not limitation) text, images, videos, multimedia, slideshows, applications ("apps"), music, audio, playlists, and ringtones.

At 508, the device determines which (if any) option that the user selected. If the user does not select a sticky messaging option, then the process returns to the inbox presentation operation at 504. Otherwise, if the user does select a sticky messaging option, the process proceeds to the next operation.

Next, at 510, the device sticks the content of the message outside the context of the inbox. Examples of such sticking operations are illustrated at 132, 142, 152, and 162 of FIG. 1. For example, the text of a text message may be posted onto a home screen of the device, the image of a multimedia message may wallpaper the home screen of the device, or the video of a multimedia message may be stored in the multimedia gallery of the device.

At 512, after the message is made sticky, the device may enable user interaction with the sticky message. Typically, the content of the sticky message is presented on the home screen of the device as an icon or widget. So, the user may interact with the sticky-message icon or widget to perform additional functions or actions regarding that sticky message. Examples of such interaction are illustrated in FIG. 3. For example, the user may choose to delete or remove the sticky message icon or widget from the home screen. In that instance, the sticky message removal does not alter or remove the original message that was the source of the content of the sticky message.

At 514, based upon the user interaction, the device may perform additional actions regarding the sticky message or related to the original message which was the source of the content of the sticky message. For example, the user may be offered an option to set-up a reminder related to the sticky message. Also, the user may, for example, be offered the option to create an appointment or schedule a meeting related to the sticky message. Other options are illustrated in FIG. 3.

The process 600 is a methodological implementation of the techniques described herein for sticky messaging where the device automatically makes an incoming message sticky. This process may be employed for the scenario, for example, when the user sends a message and indicates that the message should become sticky upon receipt.

At 602, the process 600 begins with the device receiving an incoming mobile-communications infrastructure message (such as a text and/or multimedia message) via a mobile-communications infrastructure. The message may be placed into the messaging inbox as well.

At 604, the device determines whether the incoming message meets one or more criteria for a message to be designated "sticky" automatically. The device uses one or more "sticky" criteria 606 to make that determination. Examples of sticky criteria that may be employed to make this determination include (by way of example and not limitation) designated sender, sender being a favorite, sender being in a contacts list, keywords in the content of the message, size of the message, the nature of the content, a sticky indicator being associated with the message, a meeting request being associated with the message, and a list being included in the message. Of course, the user may designate customized criteria as well.

If, for example, the incoming message was sent with a designation that it should be sticky upon arrival, the device will determine that this message meets the criteria for a message to be sticky. Also, the user may want the messages of designated senders to always be sticky or the messages of those in her list of favorites or contacts. There may be keywords (e.g., "#sticky" or "#list") that, when included in a message, indicate that it should be sticky upon receipt. In this instance, such keywords may be stripped out of the content that is made sticky.

If there is no criteria match at 604, then the process returns to beginning at operation 602. If there is a match, then the process proceeds to the next operation.

Next, at 608, the device sticks the content of the message outside the context of the inbox. Examples of such sticking operations are illustrated at 132, 142, 152, and 162 of FIG. 1. For example, the text of a text message may be posted onto a home screen of the device, the image of a multimedia message may wallpaper the home screen of the device, or the video of a multimedia message may be stored in the multimedia gallery of the device.

At 610, after the message is stuck, the device may enable user interaction with the sticky message. Typically, the content of the sticky message is presented on the home screen of the device as an icon or widget. So, the user may interact with the sticky message icon or widget to perform additional functions or actions regarding that sticky message. Examples of such interaction are illustrated in FIG. 3. For example, the user may choose to delete or remove the sticky message icon or widget from the home screen. In that instance, the sticky message removal does not alter or remove the original message that was the source of the content of the sticky message.

At 612, based upon the user interaction, the device may perform additional actions regarding the sticky message or actions related to the original message which was the source of the content of the sticky message. For example, the user may be offered an option to set up a reminder related to the sticky message. Also, the user may, for example, be offered the option to create an appointment or schedule a meeting related to the sticky message. Other options are illustrated in FIG. 3.

Exemplary Device within Exemplary Telecommunication Environment

Figure 7:
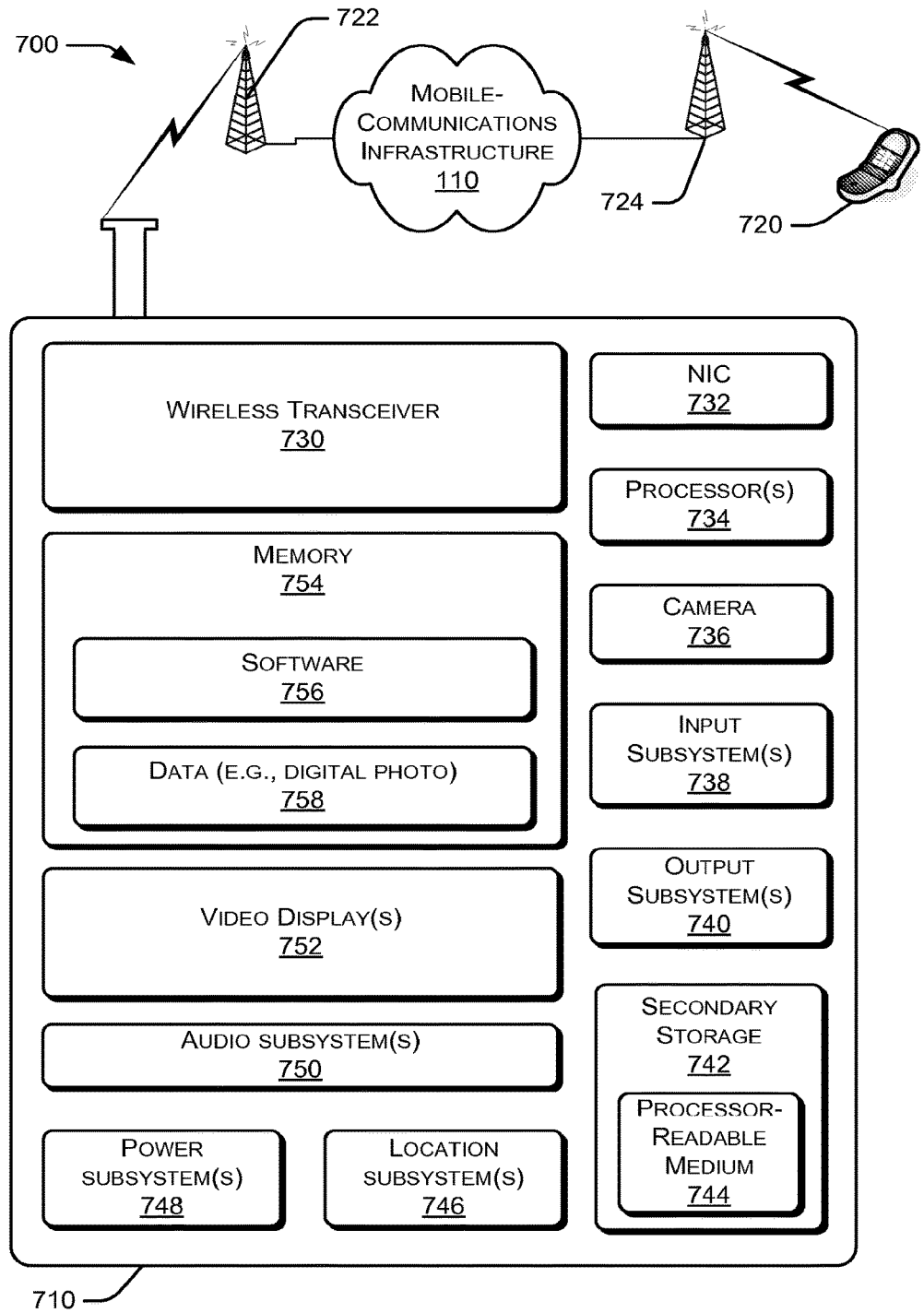
FIG. 7 depicts an exemplary telecommunications device within a telecommunications environment. The depicted device is configured to implement the techniques described herein for sticky messaging.

FIG. 7 shows an exemplary telecommunication environment 700 which includes an exemplary telecommunications device 710. Both the environment 700 and the device 710 may be included as part of one or more implementations of the techniques described herein.

As depicted, the device 710 is a smartphone that is capable of communicating using analog and/or digital wireless voice and/or data transmission. FIG. 7 shows the device 710 in communication with a cell phone 720 via the mobile-communications infrastructure 110, which includes cell towers 722 and 724.

The device 710 includes many components, such as a wireless transceiver 730, a NIC (network interface controller) 732, one or more processors 734, one or more cameras 736, one or more input subsystems 738, one or more output subsystems 740, a secondary storage 742 with at least one processor-readable medium 744, one or more location subsystems 746, one or more power subsystems 748, one or more audio sub systems 750, one or more video displays 752, and a memory 754 having software 756 and data (e.g., message content) 758 stored thereon.

The wireless transceiver 730 is a hardware component that wirelessly connects the device to the mobile-communications infrastructure 110. The wireless transceiver 730 is used for voice and/or data communications by the device.

The NIC 732 is a hardware component that connects the device 710 to one or more computer networks and allows for communication to and from that network. Typically, the NIC 732 operates as both an Open Systems Interconnection (OSI) layer 1 (i.e., physical layer) and layer 2 (i.e., data link layer) device, as it provides physical access to a networking medium and provides a low-level addressing system through the use of Media Access Control (MAC) addresses. It allows devices to connect to each other either by using cables or wirelessly.

The one or more processors 734 may include one or more single or multi-core central processing units (CPU), a graphics processing units (GPU), other processing units or components, or some combination thereof.

The camera 736 may be configurable to capture still images (clips), moving images (video) or both still and moving images. The camera components may include (by way of example and not limitation): digital sensor chip (e.g., CCD or CMOS), lenses, and the like.

The input subsystems 738 are physical devices designed to allow for input from, for example, a human user. The input subsystems 738 may include (by way of example and not limitation): keyboard, keypad, touchscreen, touchpad, mouse, trackball, paddle, light pen, scanner, stylus, and/or a micro-telecommunications device.

The output subsystems 740 are mechanisms for providing a tactile output to the user in a manner that is neither audio nor video based. Such tactile output is typically generated by an offset rotating motor that vibrates the device 710 to give a notification to the user.

The secondary storage 742 is typically a read-only memory (ROM), a programmable memory (such as EEPROM, EPROM, or PROM), a static read/writable memory (such as flash memory), and a mechanical read/writeable device (such as a hard drive), which may be magnetic, optical, holographic, and the like. The components of the secondary storage 742 may be internal to the device 710, attached externally to the device 710, or available via data communications.

At least one processor-readable medium 744 is stored on the secondary storage 742. The processor-readable medium 744 stores one or more sets of instructions (e.g., software) embodying any one or more of the methodologies or functions described herein. The instructions may also reside completely, or at least partially, within the memory 754 as software 756 and within the processor(s) 734 during execution thereof by the device 710.

The location subsystems 746 may be designed to determine the physical location of the device 710. The one or more location subsystems 746 may include (but are not limited to) an application and hardware for determining location via global positioning system (GPS) and/or by communicating with a cellular network.

The power subsystems 748 may include (but are not limited to) one or more batteries and one or more external power supplies, such as an interface to an external power supply source.

The audio subsystems 750 are configured to generate sound, noise, voices, and music. In addition, the audio subsystems 750 are configured to capture and process sound, noise, voices, and music. The audio subsystems 750 include (but are not limited to) speakers and microphones.

The video display 752 is configured to display images, videos, text, user-interfaces, and the like. The video display 752 may include (but is not limited to) a liquid crystal display (LCD), a flat panel, a solid state display or other device. The video display 752 may operate as a digital viewfinder that allows a user to preview a scene before capturing an image and/or to view a movie as it is being captured.

The memory 754 is configured to store software 756 and data (e.g., message content) 758 thereon. The memory 754 is a working space and may include (but is not limited to) random access memory (RAM). The memory 754 may be one or more of the following (by way of example and not limitation): volatile or non-volatile, dynamic or static, read/write-able or read only, random- or sequential-access, location- or file-addressable, and the like. The components of the memory 754 may be internal to the device 710, attached externally to the device 710, or available via data communications.

Additional and Alternative Implementation Notes

Mobile phones are depicted herein (such as smartphone 104 of FIG. 1 and a telecommunications device 710 of FIG. 7) as being examples of a device implementing one or more aspects of the techniques described herein. However, other wireless messaging devices that use the mobile-communications infrastructure for messaging may implement an aspect of the techniques described herein. Examples of other such wireless messaging devices include (by are not limited to): tablet-based computer, other handheld computer, netbook, laptop, digital camera, digital camcorder, handheld multimedia device, GPS navigational system, vehicle-based computer, or any messaging-capable computing device or portable electronics.

The above-described implementations are described within the context of a mobile-communication infrastructure messages (such as SMS or MMS messages). Alternative implementations may be used with other kinds of messages, such as email or instant messages. Rather than being mobile-communication infrastructure messages, email and instant messages are internet-infrastructure messages because they are intended to be transmitted over the internet rather than be exchanged between mobile devices over the mobile-communication infrastructure.

In the above description of exemplary implementations, for purposes of explanation, specific numbers, materials configurations, and other details are set forth in order to better explain the invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventors have contemplated that the claimed invention might also be embodied and implemented in other ways, in conjunction with other present or future technologies.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts and techniques in a concrete fashion. The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

The exemplary processes discussed herein are illustrated as a collection of blocks in a logical flow graph, which represents a sequence of operations that can be implemented with hardware, software, firmware, or some combination thereof. In the context of software/firmware, the blocks represent instructions stored on one or more processor-readable storage media that, when executed by one or more processors, perform the recited operations. The operations of the exemplary processes may be rendered in virtually any programming language or environment including (by way of example and not limitation): C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

The term "processor-readable media" includes processor-storage media. For example, processor-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

For the purposes of this disclosure and the claims that follow, the terms "coupled" and "connected" may have been used to describe how various elements interface. Such described interfacing of various elements may be either direct or indirect.

The invention claimed is:

1. A method, comprising:
   presenting one or more received messages of an inbox to a user on a display;
   detecting a touch and hold event on one or more of the presented one or more received messages of the inbox;
   determining whether the one or more received messages meet at least one of the following sticky criteria:
      the one or more received messages were sent by a designated sender,
      the one or more received messages were sent by a favorite sender,
      the one or more received messages were sent by a sender in a contacts list that is associated with the user, or
      the one or more received messages contain a meeting request;
   in response to (a) the detection of the touch and hold event, (b) a determination that the detected touch and hold event has occurred for at least a period of one or more seconds, and (c) a determination that the one or more received messages meet at least one of the sticky criteria:
      creating a sticky message containing content of the one or more received messages; and
      sticking the sticky message outside the context of the inbox; and
   in response to the sticking the sticky message outside the context of the inbox:
      creating or modifying a wallpaper, wherein the created or modified wallpaper contains content of the sticky message; and
      displaying the created or modified wallpaper on a home-screen user interface.

2. The method of claim 1, further comprising:
   parsing the received message for a predetermined keyword that is to identify if the one or more messages is to be made sticky, wherein the predetermined keyword includes a pound sign or number sign;
   identifying the predetermined keyword in content of the one or more received messages; and
   removing the predetermined keyword, including the pound sign or number sign, from the content of the one or more received messages to provide a modified content of the one or more messages.

3. The method of claim 1, wherein the content of the one or more received messages includes a to-do list or a check list; and in response to determining that the list has been completed, sending a message to a sender of the one or more received messages that notifies the sender that the list has been completed.

4. The method of claim 1, wherein in response to sticking the sticky message outside the context of the inbox, presenting to the user an option provided to the user to include the content of one or more of the messages into a collection of such content accessible by the user and the sticking comprises including the content of the one or more messages into a collection of such content accessible by the user.

5. The method of claim 1, wherein the touch and hold event is a user touch and hold event, involving a user body part or user implement, that includes touching and holding static on one or more of the presented one or more received messages of the inbox.

6. At least one non-transitory processor-readable medium carrying instructions for performing a method, the method comprising:
   presenting one or more received messages in an inbox of such messages, wherein the one or more received messages include text;
   detecting a touch and hold event on text content of one or more messages in the inbox;
   in response to detecting the touch and hold event and determining that the detected touch and hold event has occurred for a period of one or more seconds:
      creating a sticky message containing the text content of the one or more received messages; and
      presenting the sticky message outside the context of the inbox,
      wherein the provided text content of the one or more messages includes a to-do list or a check list, and
      wherein the to-do list or the check list contains items that may be marked as completed by a recipient of the one or more messages; and
   in response to determining that the list has been completed, sending a message to a sender of the one or more received messages that notifies the sender that the list has been completed.

7. The at least one non-transitory processor-readable medium of claim 6, wherein the presenting includes posting the content of the one or more messages onto a home-screen user interface (UI) of a telecommunications device, or wherein the presenting includes wallpapering a home-screen user interface (UI) of a telecommunications device with the content of the one or more received messages.

8. The at least one non-transitory processor-readable medium of claim 6, wherein
   in response to presenting the sticky message outside the context of the inbox—wallpapering the home-screen UI with the content of the sticky message,
   or alternatively, presenting a widget or icon to the user on the home-screen UI, wherein the widget or icon contains the content of the sticky message and information related to a source of the one or more received messages.

9. The at least one non-transitory processor-readable medium of claim 6, wherein the presenting the sticky message comprises including the content of the one or more received messages into a collection of such content accessible by a telecommunications device.

10. The at least one non-transitory processor-readable medium of claim 6, further comprising:

parsing the one or more received messages for a predetermined keyword that is to identify the one or more received messages,
wherein the predetermined keyword includes a pound sign or number sign;
identifying the predetermined keyword in content of the one or more received messages; and
removing the predetermined keyword, including the pound sign or number sign, from the content of the one or more received messages to provide a modified content of the one or more messages.

11. The at least one non-transitory processor-readable medium of claim 6, further comprising presenting a widget or icon to the user on the home-screen UI, wherein the widget or icon contains the provided text content of the one or more received messages.

12. The at least one non-transitory processor-readable medium of claim 11, further comprising enabling removal of the presented widget or icon, wherein such removal does not alter the one or more received messages that were the source of the content.

13. The at least one non-transitory processor-readable medium of claim 11, further comprising enabling interaction via the widget or icon to enable a user to direct a mobile communications device to perform an action related to the one or more received messages that were the source of the content.

14. The at least one non-transitory processor-readable medium of claim 6, wherein the touch and hold event is a user touch and hold event, involving a user body part or user implement, that includes touching static on one or more of the received one or more messages of the inbox.

15. At least one non-transitory processor-readable medium carrying instructions for performing a method, and excluding transitory signals, the method comprising:
receiving a message;
parsing the received message for a predetermined keyword that is to identify if the received message is to be made sticky,
wherein the predetermined keyword includes a special character;
determining whether the predetermined keyword is contained in content of the received message;
determining whether the received message meets at least one of the following sticky criteria:
the received message was sent by a designated sender,
the received message was sent by a favorite sender,
the received message was sent by a sender in a contacts list that is associated with the message recipient, or
the received message contains a meeting request;
in response to determining that the predetermined keyword is contained in content of the received message and that the received message meets at least one of the sticky criteria, creating a modified message by removing the predetermined keyword, including the special character, from the content of the message; and
providing the content of the modified message outside the context of an inbox.

16. The at least one non-transitory processor-readable medium as recited in claim 15, wherein providing the content of the modified message outside the context of an inbox includes posting the content of the modified message onto a home-screen user interface (UI) of a telecommunications device.

17. The at least one non-transitory processor-readable medium of claim 15, wherein the providing of the content of the modified message includes wallpapering a home-screen user interface (UI) of a telecommunications device with the content of the modified message.

18. The at least one non-transitory processor-readable medium of claim 15, wherein the providing content of the modified message comprises including the content of the modified message into a collection of such content accessible by a telecommunications device.

* * * * *